Oct. 28, 1958  R. E. SANCTUARY  2,858,098

SEAT RING FOR A BALL VALVE

Filed May 10, 1956

INVENTOR.
Robert E. Sanctuary
BY
Clayton L. Jenks
ATTORNEY

United States Patent Office 2,858,098
Patented Oct. 28, 1958

2,858,098

SEAT RING FOR A BALL VALVE

Robert E. Sanctuary, Shrewsbury, Mass., assignor to Worcester Valve Co., Inc., Worcester, Mass., a corporation of Massachusetts Application May 10, 1956, Serial No. 584,024

2 Claims. (Cl. 251—315)

This invention relates to ball valves, and more particularly to a ball valve having a double seal so arranged that fluid may be introduced from either end of the valve, as well as to a single seal valve.

A ball valve comprises a spherical ball plug having an opening therethrough communicating with the pipe passages and which is turned by a hand operated stem to control the fluid flow. The ball is provided with a central hole which forms an annulus having substantially parallel circular nose portions adapted to seat between seat rings when the valve is open. By having a seat ring on opposite sides of the ball, the fluid may be introduced from either end and the pressure of the fluid will force the ball tightly against the down stream seat when the valve is closed.

The primary object of this invention is to improve this general type of construction and to provide a valve comprising elastic seat rings which will maintain an adequate seal against escape of the fluid past the ball when the valve is closed, and which are so constructed that turning the ball will cause a plastic flow of the seat material which aids in sealing the escape passage. Other objects will be apparent in the following disclosure.

Referring to the drawings which illustrate one embodiment of the invention:

Figures 1, 2, 3, 4, 5, 6, 7:
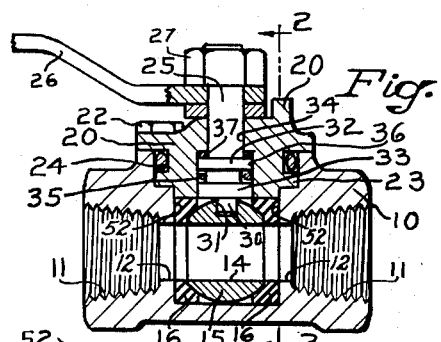
Fig. 1 is a central vertical section through a valve in open position having a hand operated ball plug positioned by seat rings on its opposite sides and supported by the body walls.
Fig. 2 is an end view of the valve with the right hand half shown in vertical section taken on the line 2—2 of Fig. 1.
Fig. 3 is an enlarged central vertical fragmentary section showing the ball positioned between its seat rings in a fully open condition.
Fig. 4 is a similar view showing the position of the ball and rings when the valve has been closed.
Fig. 5 is a fragmentary diagrammatic and enlarged sectional view drawn to scale which shows the position of the ball nose relative to the adjacent ring when the valve is fully open and showing exaggerated the flow of the compressed rim substance.
Fig. 6 is a view similar to Fig. 5 showing the ball nose position just before it contacts the lip of the ring.
Fig. 7 is a similar view indicating in exaggerated outline the required flow of the ring lip substance when the ball is turned to a closed position.

The valve structure comprises in general a body 10 made of a suitable material, such as bronze, which has two screw threaded openings 11 in axial alignment arranged for connecting the valve into a pipe line. Cylindrical passages 12 at each side communicate with a central recess 13 in the valve body. The passages 12 communicate with a passage 14 in the ball plug 15 which is mounted between two seat rings 16 in the space 13. The ball plug is an annulus having a spherical zonal surface and a central cylindrical fluid passage. The passage within the body is U-shaped, as shown in Fig. 2, and provides a semi-cylindrical bottom portion 18 against which the seat rings 16 bear. A removable bonnet 20 provides a half cylindrical surface 21 on its lower portion which completes the cylinder for supporting the seat rings. The bonnet 20, which is removably secured to the casing by cap screws 22, may be shaped to provide a circular outwardly extending flange 23 which cooperates with the casing to provide an annular space within which an elastic O-ring 24 is seated to prevent escape of fluid between the bonnet and the valve body.

A stem 25 to which is suitably secured a handle 26 by means of a lock nut 27 has at its lower end a downwardly projecting lug 30 adapted to engage a shallow slot 31 in the top of the ball plug. This handle and the interconnecting lug and slot constitute means for rotating the ball plug 15 about a vertical axis and yet permitting the ball to move slightly down stream. The stem 25 has an annular flange 32 spaced from the enlarged circular flange 33 at its lower end which is shaped to provide the lug 30. The upper portion of the stem 25 passes through a suitable cylindrical hole 34 in the bonnet, and an elastic O-ring 35 is located between the two flanged portions of the stem and engages the wall of the enlarged cylindrical bore 36 within the bonnet, and thus serves to prevent the escape of fluid upwardly around the stem. A suitable thrust washer 37 is located between the upper flange 32 and the top of the bore 36 within the bonnet. Thus, fluid is prevented from escaping both between the bonnet and the valve body and between the bonnet and the stem. By removal of the bonnet 20, access may be had to the ball plug and its associated valve seat rings; and if desired, a suitable hole may be provided in the ball plug so that a tool may be employed to withdraw the ball and its rings from the chamber 13 in the valve body.

This invention deals primarily with the construction of the seat rings which are particularly shaped to prevent the escape of fluid at the down stream side of the valve, whichever way the fluid may flow through the valve. This ring is preferably made of a soft elastomer, such as a standard slightly elastic rubber composition. As shown particularly in Fig. 6, the elastic ring in diametrical cross section is provided with an annular lip 40 and an annular rim 42 which are spaced by a substantially conical surface 44. The ring may be beveled to provide a narrow conical surface 45 adjacent the outer plane side surface 46 which is adapted to engage the adjacent flat wall of the recess 13. The ring may be beveled on the inner side of the face 46 to provide an inner conical surface 47 which ordinarily makes an angle of 30° to 45° with the plane of the end face 46 of the ring. Since the plane surface 46 lies against a flat end wall of the valve body at the end of the recess 13, the space between the conical surface 47 and the recess wall as well as the fluid channel provides room within which the elastomer of the seat ring may flow when the leading edge 50 of the flat faced portion of the ball sweeps across the ring. To prevent abrasion of both the lip 40 and the rim 42, the nose portion 50 of the ball is slightly rounded, such as to a radius of about 0.031 inch, so that the flat face of the ball may be readily revolved past the ring.

Although the dimensions and proportions of the various parts may be widely changed for the different types and sizes of valves which employ seat rings of this invention, it is to be noted that the width between the planes defining the end faces of the ball plug is greater than the space provided between the opposing faces of the two seat rings. That is, the distance $a$ (Fig. 3) plus the double thickness $b$ of the seat ring, before assembly, is greater than the total distance between the end wall surfaces 52 of the cavity 13. Hence, the ball plug and the two seat rings require being forced downwardly (Fig. 1) to assemble them in the cavity, and the ball thus places the rings under compression against the inner parallel wall surfaces 52. Consequently, the lip 40 and the rim 42 are in the path of movement of the rounded ball nose 50 when the ball is rotated through 90° to close the valve, and the leading nose 50 of the ball is obliged to force its way past the lip 40, as is obvious by an inspection of Fig. 6. This causes the elastomer to flow inwardly and to distort the wall 47 into the fluid space near the fitting 10 and thus provide a tight seal against fluid flow.

I have found that if the lip 40 has an angular edge, the elastic substance is ultimately torn or otherwise injured by the action of turning the ball nose 50 against and past the lip. Hence, as an important feature of this construction, I round the lip edge, as shown in Figs. 5 and 6, so that the forward nose 50 of the metal ball will crowd past the ring lip by a sort of cam action and push the elastomer out of the way without tearing or disrupting it.

The relation of the sphere and ring parts is diagrammatically illustrated in Figs. 5 to 7, which are fragmentary sections drawn to an enlarged scale for one type of ring and show the ball channel and a leading nose portion 50 of the ball associated with the ring. The ball and rings have been assembled under compression and the ball fits tightly against the cone surface 44 tangent thereto, so that the seat ring lip must give way when the ball is turned. The lip 40 and rim 42 of the ring are directly in the path of the ball 15 moving in the direction of the arrow, as illustrated, and the sphere is to remain tangent to and touching the cone face 44. Hence, when the ball is rotated and since the lip has a smooth round surface and not a sharp corner at its edge, the rounded metal nose 50 squeezes the lip and cams the elastomer outwardly out of the way, as shown in Fig. 7. This movement of the elastomer at the lip 40 causes the ring substance to bulge into the available space provided between the body wall and the beveled surface 47, as well as outwardly into the fluid channel, as is indicated by the line 54 in Fig. 7. This results in a tight seal between the lip 40 and the spherical portion of the ball (Fig. 7) in the region of compression. Release of this compression of the elastomer lip can be felt in the ease of movement of the handle 26 just as the valve is swung finally to the fully open position of Fig. 5, where the lip 40 resumes its initial shape, as can be seen by assuming the ball to move counterclockwise in Fig. 6 and the nose 50 to move upwardly past the lip 40 to the position of Fig. 5.

Also, as shown in Fig. 5, the rim 42 is compressed and its substance is caused to flow into available space and provide a tight seal of the elastomer under compression against the ball face. When both the lip and the rim are compressed (Fig. 4) at the time the valve is closed, there is somewhat of an opposing flow moment between these two portions 40 and 42. That is, the rim 42 on the seat ring is so located that its interference fit with the ball causes a counter flow of the rim substance relative to the lip flow so as to provide a balancing moment within the elastomer when both lip and rim are compressed simultaneously. As shown, the rim 42 is provided with a rounded surface, like lip 40, so that its substance is readily cammed out of the way when the nose 50 moves past it. This counter flow aids in compressively sealing the conical ring face 44 more tightly against the ball and thus increases the sealing force of contact of the valve ball with the ring.

Fig. 3 shows the locations of the valve parts when the fluid is flowing normally in either direction. The valve ball has been assembled under pressure against the seat rings so that the spherical surface of the ball fits tightly and is tangent to the conical surface of the ring. The lip 40 in the open position of the valve engages the substantially flat adjacent face of the ball plug and retains its normal shape and the rim 42 is under compression (Fig. 5). It will be observed that the fluid has access to the upper part of the valve body, but the two O-rings 24 and 35 effectively hold the pressure. As indicated in Figs. 6 and 7, when the leading nose 50 of the ball contacts the inner lip 40, the cam action of the nose against the rounded edge of the lip forces the ring material to flow without being torn or injured by the ball nose edge. Then, when the ball has made its full 90° rotation to the closed position of Fig. 7, the spherical surface of the ball contacts the cone face 44 and holds the lip 40 compressed and displaced, while the nose of the ball lies close to the rim 42. As shown in Fig. 5, the major portion of the rim is compressed by the contacting spherical surface of the ball when in an open position. The dimensions of the rim 42 may be made such that the rim provides contact with the cut off side or nose portion 50 of the ball. They are shown separated in Fig. 7. This compressive action causes a lateral plastic flow of the elastic or resilient substance of the lip 40 and the rim 42 and the compressive force sets up a resultant sealing force between the ball and ring which effectively opposes any fluid flow past the ring.

When the valve is fully closed, the fluid pressure in the direction of the arrow (Fig. 4) holds the ball tightly against the down stream ring and the lip 40 is under a full compression with the ball tight against the cone 44, so that the seal is effective between the rear ring wall, the valve casing and the ball. On the upstream side, the ball may have moved slightly away from the left hand ring, as permitted by the loose fit of the stem lug 30 with the ball, but any fluid that leaks past the ball into the upper part of the valve casing is of course stopped by the O-rings above.

In this construction of the type defined, each seat ring has opposed side faces and outer and inner concentric walls. The outer peripheral or cylindrical wall is snugly mounted within the cylindrical space defined by the walls 18 and 21 of the valve body and bonnet. The extensive plane surface of wall 46 of the ring seals against the flat wall of the valve body. The front side wall of the ring may be variously shaped, but is shown as parallel with the wall 46. The ring comprises in particular the conical wall 44 adapted to make a tangential fit with the spherical surface of the ball and which is bounded at its inner circumference by the rounded projecting lip 40 shaped as above defined to provide a smooth sweeping action of the ball nose 50 across the lip without disrupting it. The front face of the lip is preferably parallel to the back wall 46 so as to provide a flat face against which the adjacent nose portion of the ball may rest in the open valve position (Fig. 5).

As a further feature of the invention, the outer annular rim 42, which projects above the plane of the conical wall 44 and merges into the front face of the ring, is likewise so shaped that it is brought under compressive pressure when the spherical portion of the ball is rotated thereagainst. The two projecting portions, the lip and the rim, thus cooperate in providing the opposing flow of elastomer within the ring body as the ball compresses them in its rotative movement. These two features, therefore, cooperate to provide a long life of useful service for the seat ring. Various other advantages will be apparent in the above disclosure.

It will also be appreciated that if the valve is to be a one way flow unit, such as those of standard structure, it may have a suitable thrust bearing on the upstream side and only a single seat ring of the type herein disclosed is required. Hence, this invention pertains to the structure of a single seat ring whether used in a dual ring valve or a single ring valve.

It will, therefore, be understood that various modifications may be made in the above construction without departing from the principles of the invention above set forth and that the claims are not to be interpreted as

I claim:

1. In a valve body having separated end walls providing an inner space bounded by a peripheral surface and inlet and outlet fluid passages through the walls, a rotatable ball in said space having a part-spherical surface, a fluid passage and two opposed rounded annular ball noses, and a pair of seat rings holding the ball therebetween, the seat ring adjacent to the outlet passage comprising an elastomeric body having a rear face positioned by the adjacent end wall, an outer face located by said peripheral surface, an inner surface defining the fluid passage communicating with the end wall passage, a front inwardly extending substantially conical surface compressively engageable with said ball surface, and a compressible annular raised lip adjacent to the fluid passage, said lip having a smooth rounded face extending outwardly of the conical surface which is located closely adjacent to the ball nose when the ball is positioned for a full fluid flow but which lies in the path of movement of the nose when the ball is turned, so that the smooth lip and rounded nose cause the lip substance to be compressively and gradually displaced by the moving nose and provide a fluid sealing pressure by both the conical surface and the lip against the ball when the ball is positioned to stop the fluid flow.

2. A seat ring according to claim 1 comprising an annular rim outside of and bounding the conical surface, said rim having a rounded surface portion projecting into the space normally occupied by the ball when in tangential engagement with the conical surface in the open valve position, the lip and the rim providing opposing movements of the elastomer when both are under compression, the seat ring having an undercut conical face providing space between the ring and the adjacent outlet wall into which the elastomer may flow.

References Cited in the file of this patent

UNITED STATES PATENTS 2,606,738    Glen _____ Aug. 12, 1952

FOREIGN PATENTS 692,085    Great Britain _____ of 1953